United States Patent
Overschie

(10) Patent No.: US 7,277,792 B2
(45) Date of Patent: Oct. 2, 2007

(54) VEHICLE GUIDANCE SOFTWARE, METHOD AND SYSTEM

(75) Inventor: Jaap Overschie, Paddington (AU)

(73) Assignee: Beeline Technologies, Queensland (AU)

( * ) Notice: Subject to any disclaimer, the term of this patent is extended or adjusted under 35 U.S.C. 154(b) by 0 days.

(21) Appl. No.: 10/487,977

(22) PCT Filed: Aug. 29, 2002

(86) PCT No.: PCT/AU02/01175

§ 371 (c)(1),
(2), (4) Date: Jan. 27, 2005

(87) PCT Pub. No.: WO03/019430

PCT Pub. Date: Mar. 6, 2003

(65) Prior Publication Data

US 2005/0171684 A1   Aug. 4, 2005

(30) Foreign Application Priority Data

Aug. 29, 2001  (AU) .................................... PR7337

(51) Int. Cl.
*G06F 11/30* (2006.01)
*G01C 7/00* (2006.01)

(52) U.S. Cl. ...................... 701/206; 180/167

(58) Field of Classification Search ................ 701/206, 701/23, 25, 26; 180/167, 168, 23, 24.02; 901/1; 340/933, 942
See application file for complete search history.

(56) References Cited

U.S. PATENT DOCUMENTS

| | | | | |
|---|---|---|---|---|
| 4,852,677 A | * | 8/1989 | Okazaki | 180/169 |
| 5,109,340 A | * | 4/1992 | Kanayama | 701/25 |
| 5,739,657 A | * | 4/1998 | Takayama et al. | 318/587 |
| 6,092,468 A | * | 7/2000 | Hase | 105/73 |
| 6,134,486 A | * | 10/2000 | Kanayama | 701/23 |
| 6,272,406 B2 | * | 8/2001 | Alofs et al. | 701/24 |
| 6,377,889 B1 | | 4/2002 | Soest | |
| 6,393,362 B1 | * | 5/2002 | Burns | 701/301 |

FOREIGN PATENT DOCUMENTS

| | | |
|---|---|---|
| CA | 2212240 A | 2/1999 |
| WO | WO 00/24239 A | 5/2000 |

* cited by examiner

*Primary Examiner*—Dalena Tran
(74) *Attorney, Agent, or Firm*—Leydig, Voit & Mayer, Ltd.

(57) ABSTRACT

The present invention relates to vehicle guidance software for use with an agricultural vehicle having a guidance system. The software includes a processing portion (24) for generating a set of guidance indicators from a set of waypoints. The software further includes an adapting portion (26) for analyzing the guidance indicators produced by the processing portion (24) and determining whether the guidance indicators define a path that cannot be traversed by the vehicle due to its minimum turning radius. In the event that a path cannot be traversed by the vehicle the adaptive portion (26) generates a set of alternative guidance indicators that define a path that is traversable by the vehicle.

12 Claims, 10 Drawing Sheets

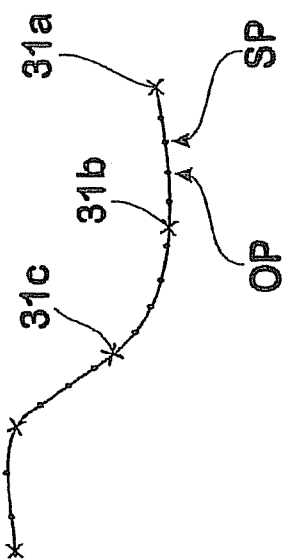
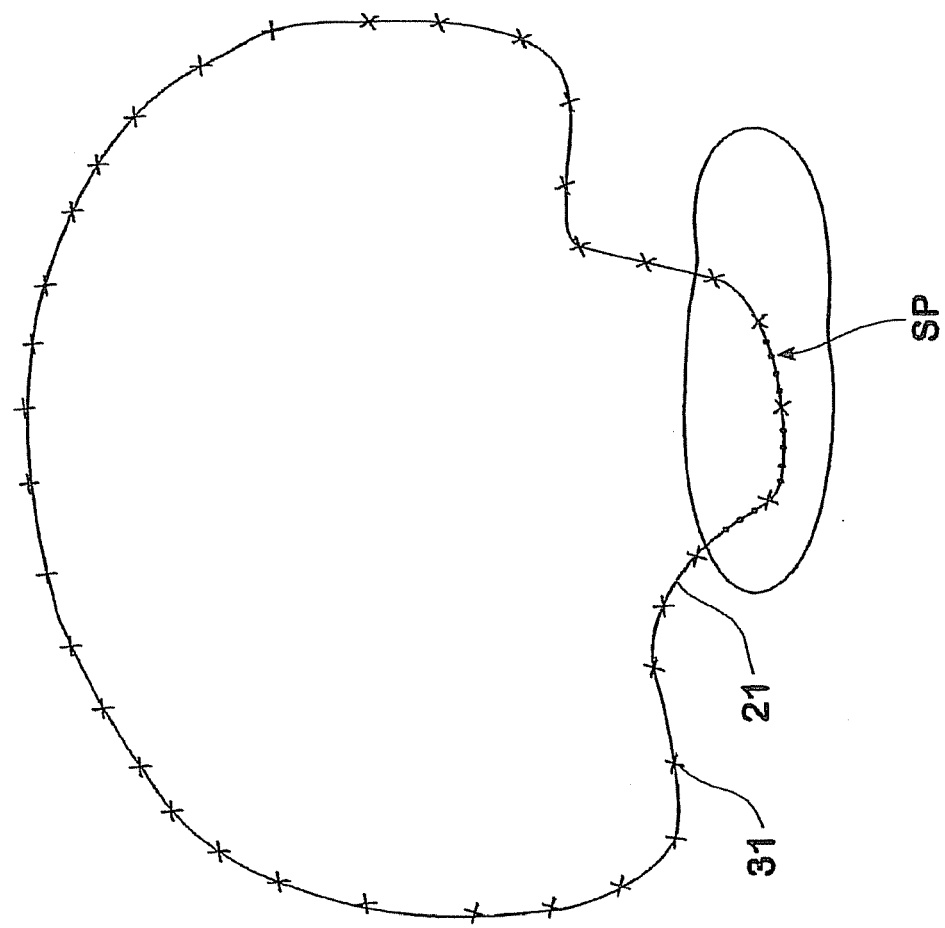

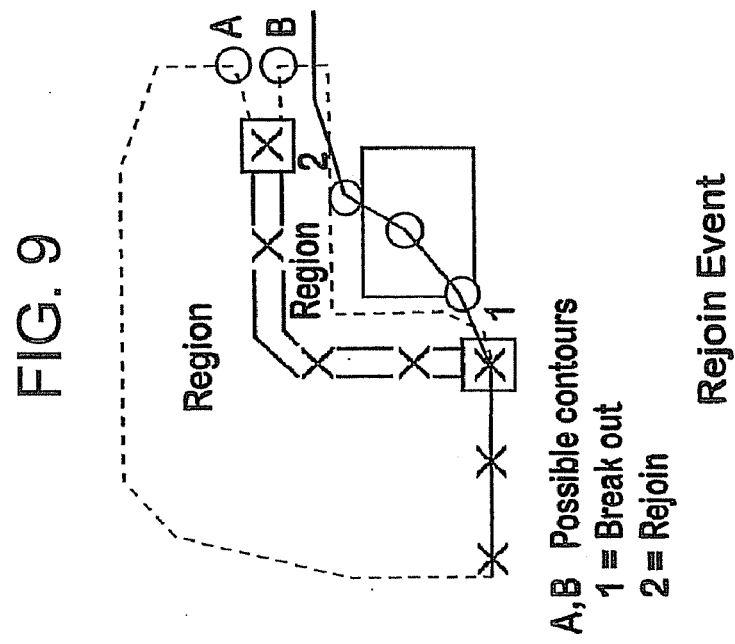
FIG. 9
A,B Possible contours
1 = Break out
2 = Rejoin    Rejoin Event
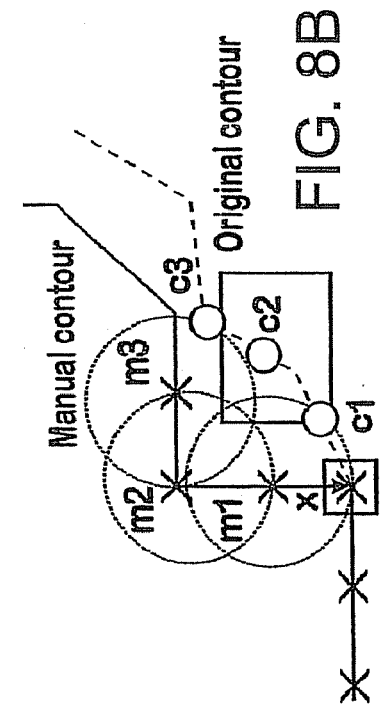
FIG. 8A
Vehicle Breaks out
FIG. 8B
Manual Contour ($m_i \sim c_i$, for $i = 1,2,3..$)

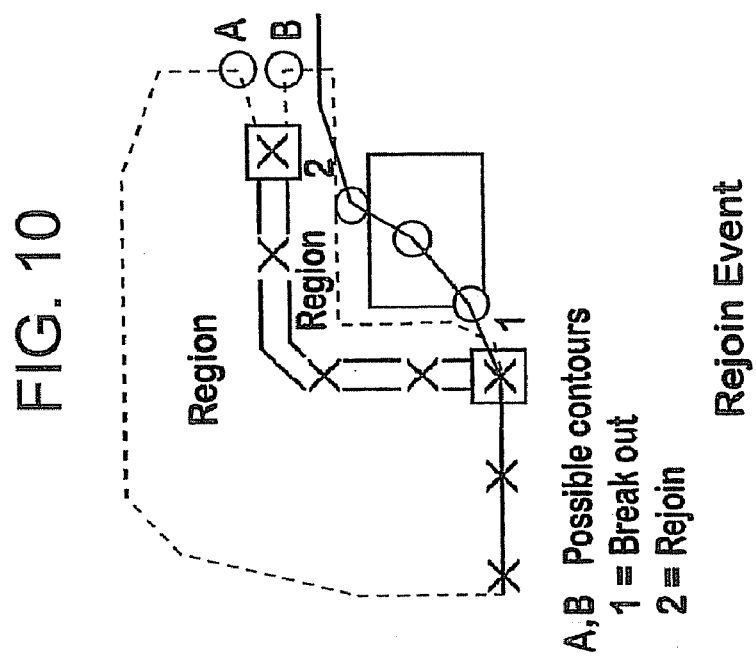
FIG. 10
A,B Possible contours
1 = Break out
2 = Rejoin        Rejoin Event
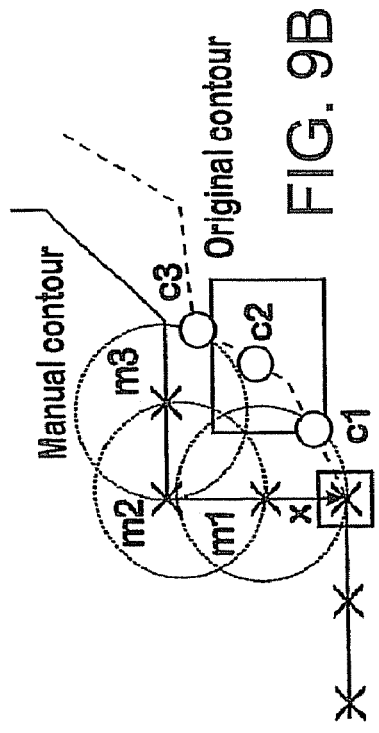
FIG. 9A
Vehicle Breaks out
FIG. 9B
Manual Contour ($m_i \sim c_i$, for $i = 1,2,3..$)

VEHICLE GUIDANCE SOFTWARE, METHOD AND SYSTEM

FIELD OF THE INVENTION

The present invention relates to vehicle guidance software, a computer for guiding a vehicle and a guidance system for a vehicle. In particular the present invention relates to vehicle software for use with an agricultural vehicle.

BACKGROUND TO THE INVENTION

It is not always preferable to plough an area of land in a series of straight, and substantially parallel lines. An example of this is where the boundary of the area is not in a regular shape, such as a square or rectangle, wherein ploughing the area in straight lines results in less overall area being sowed with crops than would be the case if the area was ploughed in a series of concentric paths that follow the boundary of the area.

Another example of where ploughing in parallel straight lines is not preferable is where a central irrigation point delivers irrigant in a radially outward direction. If the area is ploughed in parallel straight lines a uniform, volume of irrigant may not be received throughout the area.

Finally, where the area to be ploughed is sloped, it is preferable to plough along lines of uniform elevation, which usually do not follow a straight path.

Computer guided agricultural vehicles are known in the prior art. For example in the international patent application PCT/AU99/00930 (WO 00/24239) to the same applicant, there is described a computer guided agricultural vehicle which follows a series of parallel straight lines. The current guidance systems generally operate by specifying initial path data to the system, that is usually a straight line, with the system generating a subsequent path for the vehicle to follow using the specified path data. The vehicle is then guided along the paths by the guidance system.

Current computer guidance systems for agricultural vehicles however have not been particularly successful in generating guidance paths other than straight lines that can be easily followed by an agricultural vehicle. It has even been found that it is necessary for a vehicle to be stopped and reversed in order to follow the path that has been generated by the guidance system. Having to stop and reverse the vehicle is inconvenient because the implements used are usually towed and cannot be raised hydraulically. It is also a waste of resources such as fuel, particularly where broad acre farming is involved.

It is an object of the present invention to provide a guidance which allows a vehicle to be continually guided along a generated path without having to stop and reverse the vehicle.

SUMMARY OF THE INVENTION

According to a first aspect of the invention there is provided vehicle guidance software including:

an input portion for data corresponding to a set of waypoints defining an initial course for said vehicle;

a processing portion adapted to produce guidance indicators usable by a guidance system for said vehicle from said plurality of waypoints; and an adaptive portion for generating alternative guidance indicators if one or more of the generated guidance indicators define a path that can not be traversed by the land vehicle due to its minimum turning radius.

Preferably, the guidance software also includes means for determining the set of waypoints. Typically, the means for determining the set of waypoints is a GPS receiver.

Alternatively, the set of waypoints may be retrieved from a data storage medium.

Preferably, the vehicle guidance software also includes means for determining a successive set of waypoints from a current set of waypoints to define a successive path for the vehicle. Preferably, the successive set of waypoints comprises a corresponding waypoint for each waypoint in the current set, each said corresponding waypoint being offset from a current waypoint by the working width of the vehicle and wherein the tangent to the path at each corresponding waypoint is parallel to the tangent at its current waypoint.

Optionally, the successive set of waypoints may be calculated from the mathematical path defined by the guidance indicators and the alternative guidance indicators, each of the successive set of waypoints being calculated to be offset from the mathematical path by the working width of the vehicle, and wherein the tangent to the path at each of said successive set of waypoints is parallel to the tangent of the mathematical path at the point perpendicular to each successive waypoint.

Typically, guidance indicators are produced from the set of waypoints via a computer assisted interpolation between the waypoints. Preferably, the interpolation is according to a bi-variate periodic bi-cubic B-spline fitting algorithm. However, other fitting algorithms may be used.

Preferably, the alternative guidance indicators are on an arc of a circle having a radial length equal to the minimum turning radius, said circle contacting the path defined by the current guidance indicators at more than one point.

According to a second aspect of the present invention there is provided a computer implemented method for guiding a vehicle having a guidance system associated therewith and a minimum turning radius, said method including the steps of:

generating guidance indicators from a plurality of waypoints;

determining whether one or more of the generated guidance indicators define a path that can not be traversed by the vehicle due to its minimum turning radius and if necessary, determining one or more alternative guidance indicators; and utilising the guidance indicators, and alternative guidance indicators in the guidance system to guide the vehicle.

According to a third aspect of the present invention there is provided a guidance system for a vehicle having a minimum turning radius, said system comprising:

a processor;

a computer program, executable by the processor for generating a plurality of guidance indicators from a set of waypoints and for determining alternative guidance indicators if the generated guidance indicators define a path that can not be traversed due to the minimum turning radius; and means for utilising the generated guidance indicators and the alternative guidance indicators to guide the land vehicle.

BRIEF DESCRIPTION OF FIGURES

In order that this invention may be more readily understood and put into practical effect, reference will now be made to the accompanying drawings which illustrate typical preferred embodiments of the invention and wherein:

FIG. 5 depicts points defining a path generated from the points depicted in FIG. 4.

FIG. 5A is a close-up of a section of FIG. 5.

FIGS. 9a and 9b are diagrams illustrating a vehicle departing from the path of a guidance contour under operator control.

FIG. 10 illustrates paths followed by a vehicle rejoining a path according to an embodiment of the present invention.

DETAILED DESCRIPTION OF PREFERRED EMBODIMENTS

Figure 1:
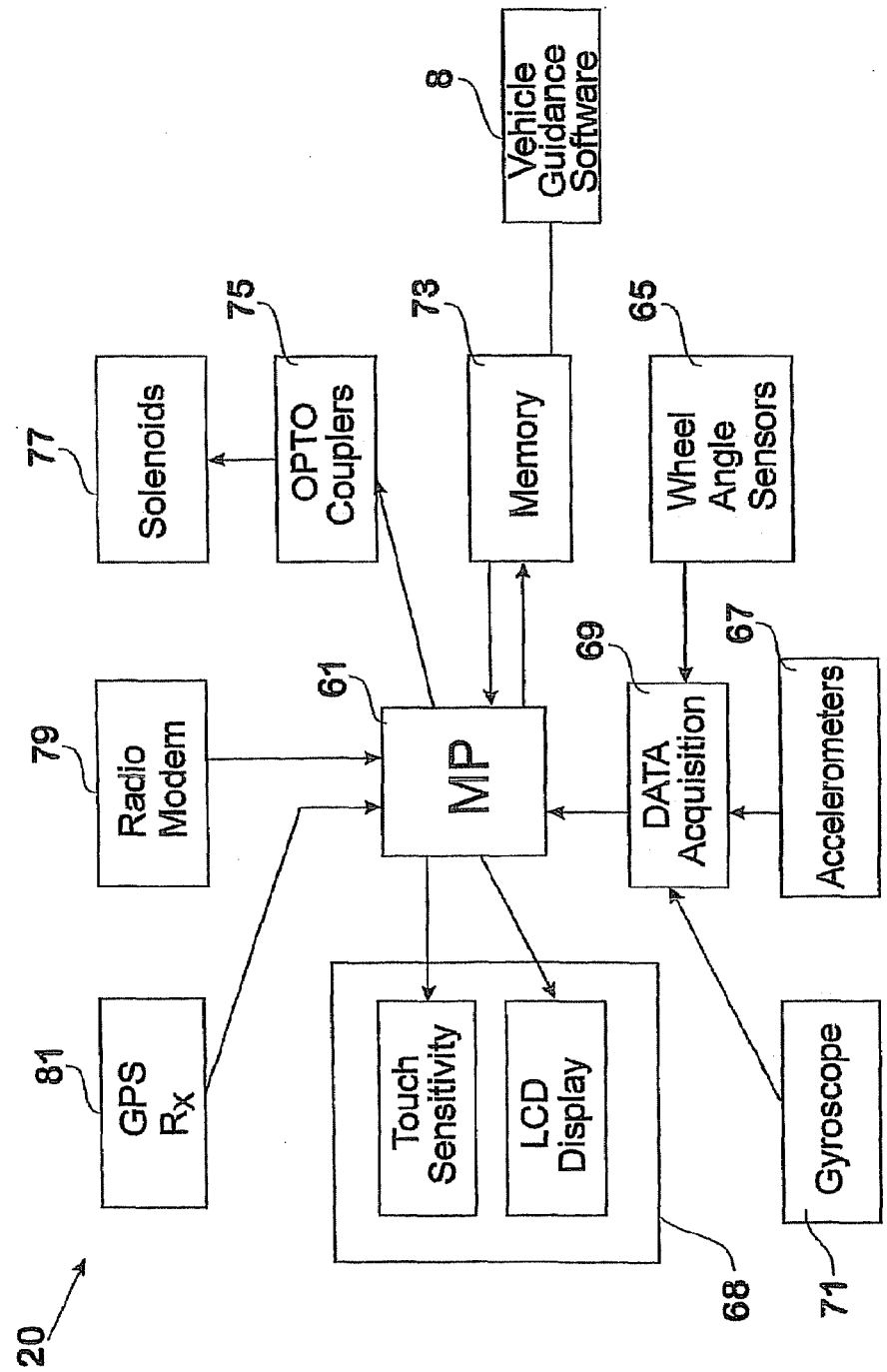
FIG. 1 depicts a guidance system according to an embodiment of the present invention and including a computer memory device loaded with vehicle guidance software according to an embodiment of the present invention.

Referring now to FIG. 1 there is depicted a guidance system 20 for use with the vehicle guidance software of this embodiment of the present invention. The system is similar to that described by the present applicant in WO/24239, however memory 73 is loaded with vehicle guidance software according to this embodiment of the present invention. The vehicle guidance software 8 may be supplied on CD-ROM, magnetic media or any other computer-readable media for installation and execution by processor 61.

In use the guidance system of FIG. 1 is mounted to a vehicle such as a tractor. GPS receiver 81, radio modem 79, gyroscope 71 and accelerometers 67 all provide data concerning the position and direction of movement of the vehicle to processor 61 for processing according to the vehicle guidance software 8. Other guidance systems used for providing such data might also be used. The particular details of the guidance system used for providing positional and directional data does not form a part of the present invention and will not be described in further detail here. Similarly solenoids 77 which are mounted to the steering hardware of the vehicle for steering the vehicle under processor control and opto-couplers 75 are also known in the art as are wheel angle sensors 65 and data input/output module 65.

Figure 2:
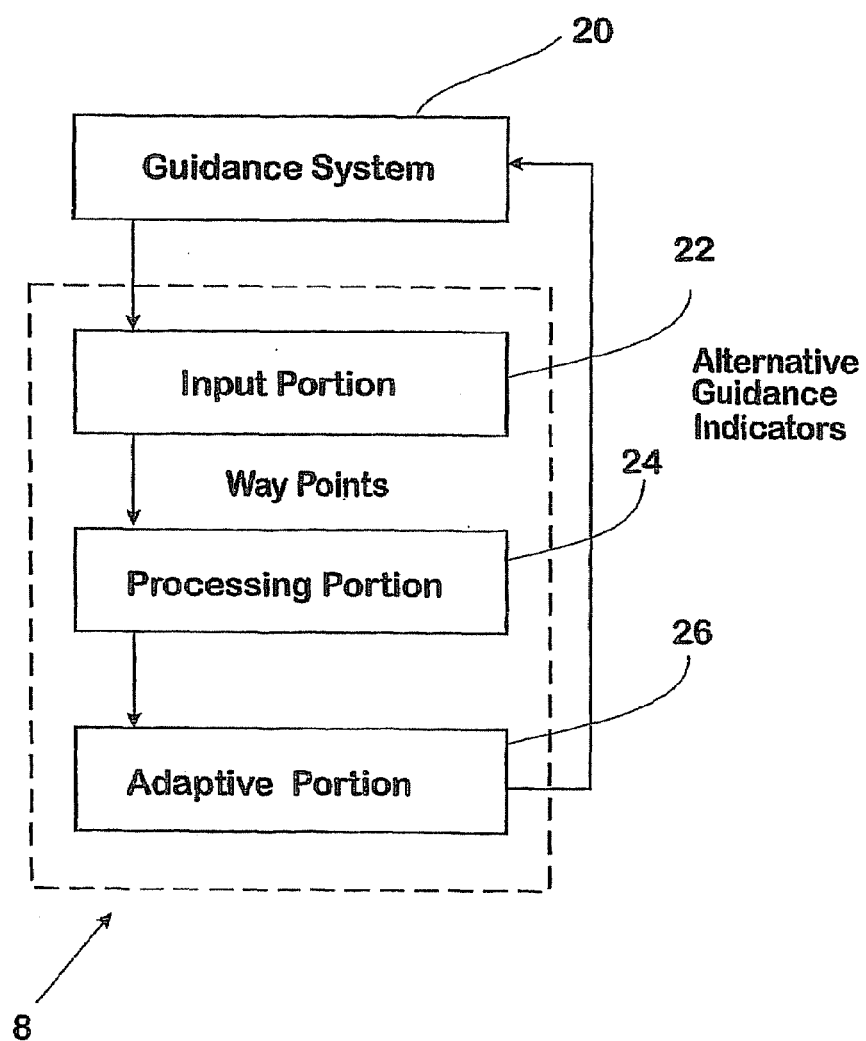
FIG. 2 is a schematic diagram of the vehicle guidance software of the present invention.

As illustrated in FIG. 2, the guidance system 20 is coupled to the input portion 22 of the vehicle guidance software which is enclosed within the dotted lines. As will be explained further below, the input portion is adapted to receive position data from the GPS receiver in the form of a set of waypoints representing the geographical position of the vehicle determined at regular intervals as the vehicle travels along an initial path. This set of waypoints is delivered to the processing portion 24 of the vehicle guidance software.

On receipt of the waypoints by the processing portion 24, the vehicle guidance software 8, through use of an appropriate algorithm, the details of which are given below, produces a set of guidance indicators. As will be explained further below, the guidance indicators represent further points of positional data along the path that have been produced by interpolating between the waypoints supplied to the processing portion 24 of the vehicle guidance software 8.

The guidance indicators so produced, are then forwarded to the adaptive portion 24 of the vehicle guidance software 8. The adaptive portion 26, then analyses the guidance indicators produced by the processing portion 24, and determines whether the guidance indicators define a path that can not be traversed by the vehicle due to its minimum turning radius. Parameters of the vehicle, such as the minimum turning radius are supplied to the vehicle guidance software 8 by the operator of the vehicle via the data input/output module 68. Obviously, the determination by the adaptive portion 26 of the guidance indicators will vary, depending on the value of the minimum turning radius input to the vehicle guidance software 8.

In the event that a path that can not be traversed by the vehicle is detected by the adaptive portion 26, a set of alternative guidance indicators, that represent a path that is traversable by the vehicle is generated by the adaptive portion 26.

It is then this set of alternative guidance indicators, that define a path that is traversable by the vehicle, that is delivered to the guidance system 20 along with the remaining guidance indicators that can be traversed for guidance of the vehicle.

Figure 3:
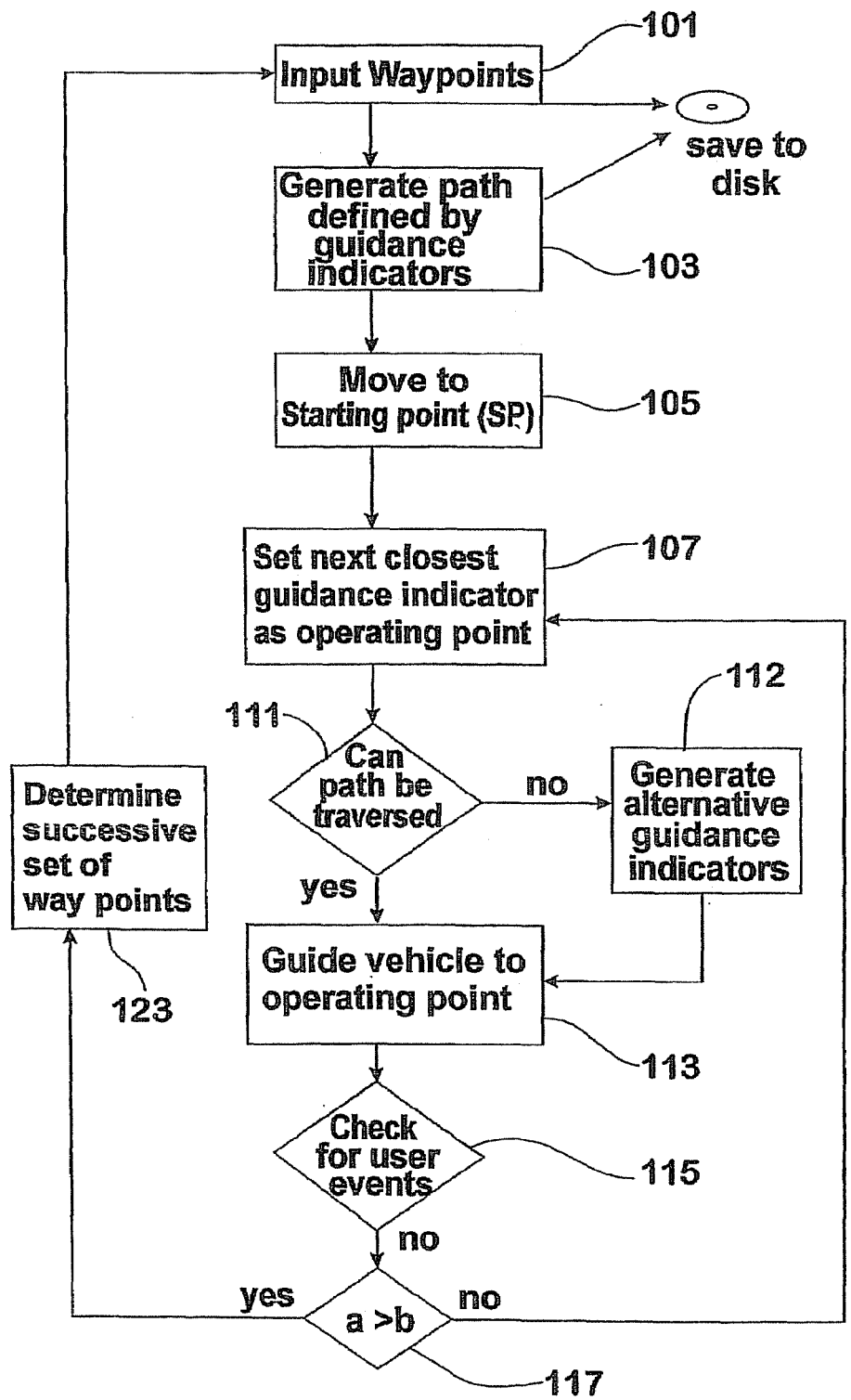
FIG. 3 is a flowchart of a method and vehicle guidance software according to the present invention.

The operation of the vehicle guidance software 8 is described in further detail in FIG. 3. At box 101 of FIG. 3 the waypoints defining a boundary are input and stored in a data structure such as an array or computer readable file.

Figure 4:
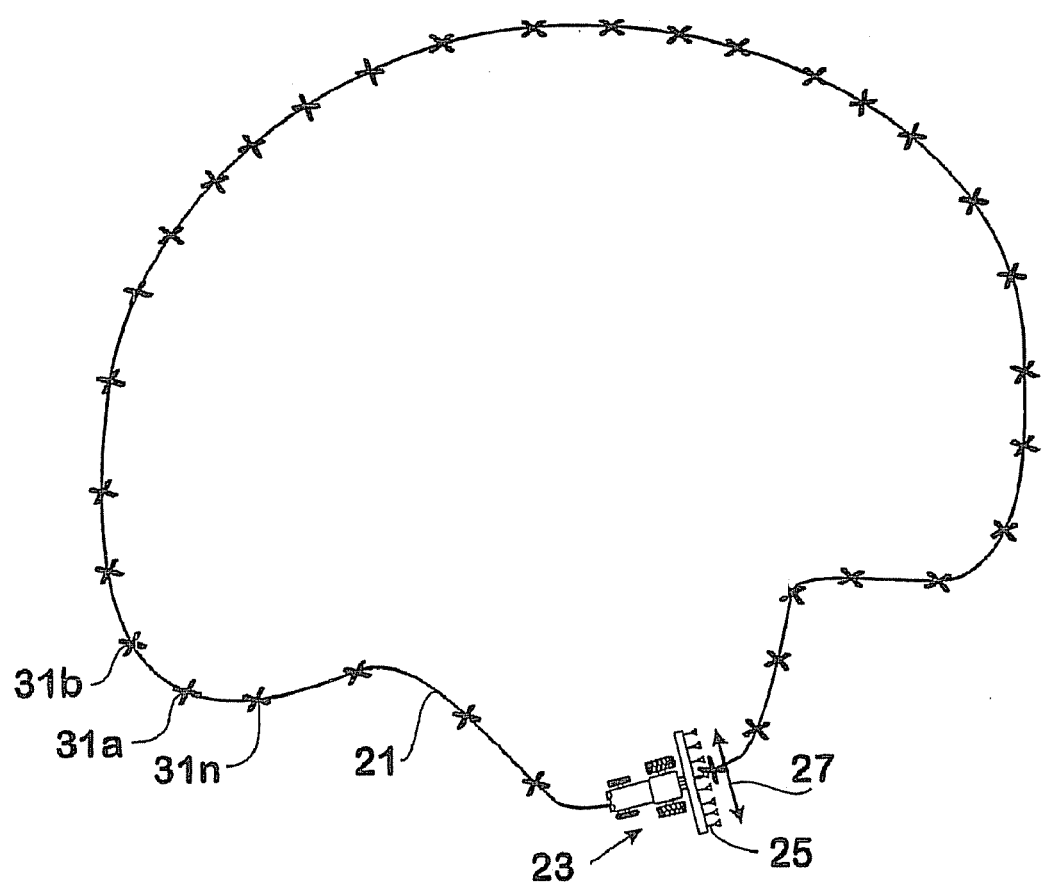
FIG. 4 depicts points defining a boundary.

In order to explain this procedure further reference is made to FIG. 4 which depicts an outer boundary 21 of a paddock to be operated on by a vehicle 23 towing a working implement 25 of width 27. Initially the vehicle guidance software 8 prompts for the entry of data defining the boundary 21, via the input/output controller 65.

The data is most conveniently generated by driving vehicle 23 around the boundary and downloading positional data at regular intervals by means of items 81, 79, 71 and 67 of the guidance system of FIG. 2. The downloaded position data are stored by the program in a data structure such as an array or computer readable file. The downloaded boundary points comprise the set of waypoints $31a, \ldots, 31n$ defining boundary 21. The points $31a, \ldots, 31n$ are typically about 5 m apart.

At box 103 of FIG. 3 a path is generated by the processing portion 24 which corresponds to the boundary. The path is a curve defined by points on the curve known as guidance indicators generated by applying a curve fitting procedure to the $31a, \ldots, 31n$ of FIG. 5. The path is defined by many more guidance indicators than the set of waypoints $31a, \ldots 31n$ which define the boundary. Several numerical mathematics algorithms are known which are capable of generating the guidance indicators and which could be applied to the implement the present invention. However the present inventors have found that for their purposes a bi-variate periodic bi-cubic B-spline fitting algorithm is preferred partly because of the fact that this algorithm produces a smooth curve between the waypoints. The original data may be parameterised using Eugene Lee's centripetal scheme, i.e. as accumulated square root of chord length.

A great many guidance indicators are not required along segments of the path having large curvature. Accordingly some of the guidance indicators may be discarded along path segments having large curvature, as positional accuracy of the vehicle is not as difficult to maintain along such segments.

With reference to FIG. 5 there is shown the boundary 21 with waypoints 31*a*, . . . , 31*n* shown as crosses. Initially the curve fitting algorithm is applied over waypoints between 10 m and 200 m ahead of the vehicle in order to generate guidance indicators. The guidance indicators are shown as filled circles in FIGS. 5 and 5A.

At box 105 of FIG. 3 the vehicle is moved to a starting point SP being one of the guidance indicators defining the path. The driver of the vehicle is guided to the starting point by the guidance system utilising a display or power assisted steering as, for example described in the previously identified international patent application.

Once the vehicle has arrived at the SP the next closest guidance indicator on the path is set as the first operating point OP 107 which is the point that the vehicle will be guided towards.

At box 111 one or more of the guidance indicators ahead of the OP are examined to determine if they define a path that can not be traversed by the vehicle due to its minimum turning radius. The minimum turning radius of the vehicle is a parameter that may be entered upon start-up of the vehicle guidance software as was noted above. If the guidance indicators do describe a curve with a turning circle less than that of the vehicle then it will not be possible for the vehicle to follow that path. Accordingly the vehicle guidance software 8 will employ the adaptive portion to generate alternative guidance indicators 112 that define the path such that a path which the vehicle can traverse is produced. The method followed by the adaptive portion 26 in implementing this task will be described in more detail below.

The vehicle then moves towards the OP guided by the guidance system of FIG. 2 in accordance with the vehicle guidance software 8. At box 115 a check is performed for user events. Such events might include the driver steering the vehicle off the path, for example to re-fuel or to avoid an obstacle. In the event that no such event has occurred then the system proceeds to box 117. At box 117 the distance between the current OP and the next guidance indicators on the path, i.e. the next OP towards which the vehicle will be guided is calculated and stored in a variable "a". The distance between the current OP and the starting point is also calculated and stored in a variable "b". A test is then performed to determine if a>b. If a>b then it is known that the vehicle has almost completed its passage around the path. In that event control passes to box 123. Alternatively if the next OP is closer than the starting point SP then it is known that the vehicle must pass through at least the next OP in order to complete the contour. Accordingly, in that event control passes to box 107 where the next operating point is determined.

Control only diverts to box 123 upon the first contour being completed. In that event a successive set of waypoints, to be used in generating a further path offset from the first one, must be generated.

Figure 6:
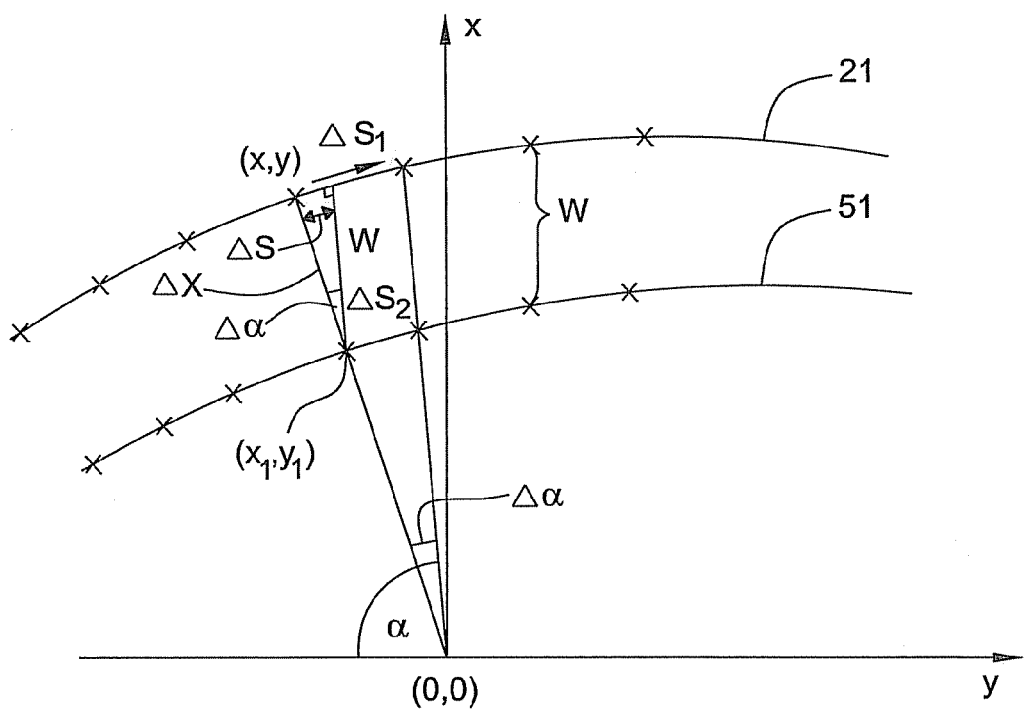
FIG. 6 illustrates the geometry relating a first path to a second path as determined by an embodiment of the present invention.

With reference to FIG. 6 a corresponding waypoint (x1, y1) for an inner path 51 is generated from a current waypoint (x, y) for an outer path by observing that $\Delta s = w \Delta \alpha$; $\Delta x = \Delta s \cos \alpha$; $\Delta y = \Delta s \sin \alpha$. Using coordinate transformation rules x1=x±Δx and y1=y±Δy, equivalently x1=x±Δs cos α and y1=y±Δs sin α. The same equations may be rewritten as:

$$x1 = x \pm w(dy/ds)/\sqrt{[(dy/ds)*(dy/ds)+(dx/ds)*(dx/ds)]}$$

$$y1 = y \pm w(dx/ds)/\sqrt{[(dy/ds)*(dy/ds)+(dx/ds)*(dx/ds)]}$$

the above formulas are programmed using standard numerical mathematics routines.

In the above formulas:

w is the width of the field processing implement (x, y) is a waypoint on the outer path (x1,y1) is a point on the inner path corresponding to (x, y)

α is the angle created at the orthogonal (Cartesian) coordinate at the centre of radius of curvature (0,0) of this segment of the contour.

Δα is the difference in α for two successive points on the outer contour.

Δs, Δs1, Δs2 are differential arcs created by two successive points on the contour.

dy/ds is the instantaneous rate of change in y direction with respect to the contour path, s.

dx/ds is the instantaneous rate of change in the x direction with respect to the contour path, s.

Each waypoint for the path 51 is generated according to the above method. Consequently the derivative of path 51 at any corresponding waypoint (x1, y1) is the same as at the current waypoint (x, y) on the outer boundary 21. A further set of waypoints for a subsequent path 72 (FIG. 7) may be generated from the points of boundary 51 in the same manner and so the procedure may be repeated. Path segments between waypoints are generated by means of the interpolating spline algorithm previously described.

Figure 7:
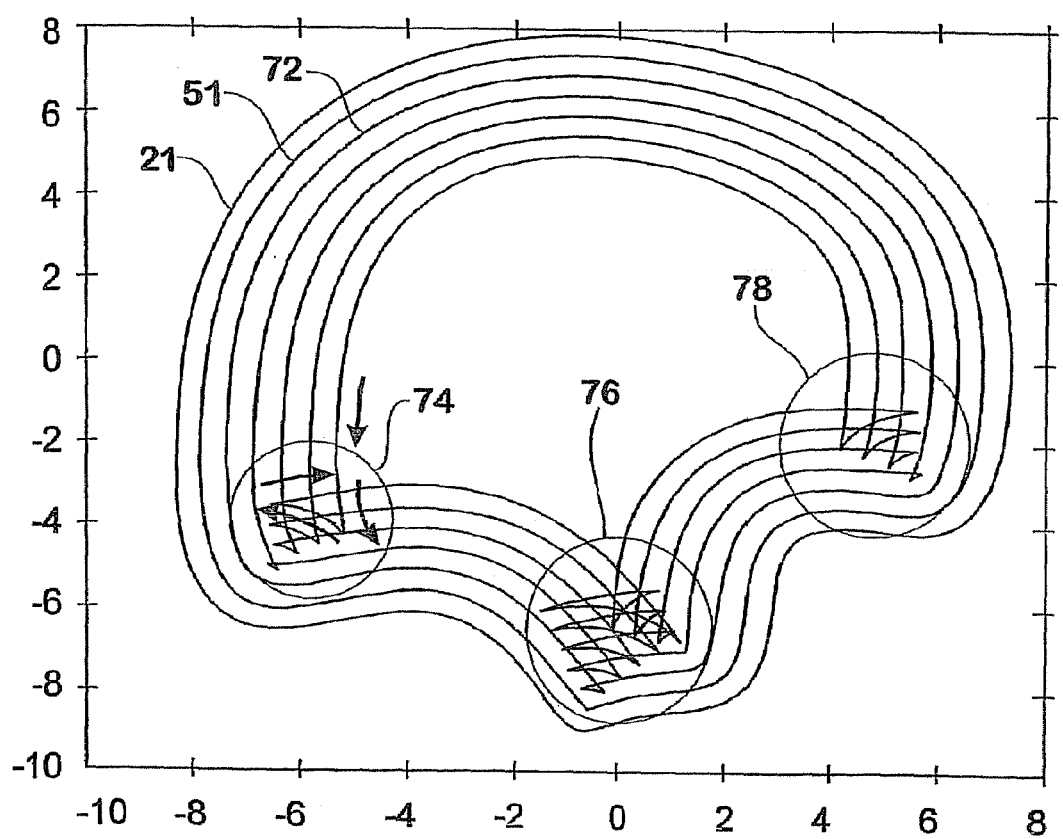
FIG. 7 shows paths generated by an embodiment of the present invention that have portions that can not be traversed by the vehicle due to its minimum turning radius.

Referring now to FIG. 7, the path following boundaries 21, 51 and 72, (and four subsequent inner paths), generated by the software guidance system are illustrated. In the circled regions 74, 76 and 78, the paths as initially calculated incorporate curves having a radius less than the minimum turning radius of the vehicle. In order to traverse these paths, it is necessary for the operator to reverse the vehicle in these regions. An example of the reversal needed for the innermost path in region 74 is illustrated by the arrows.

The operation of the adaptive portion to generate alternative guidance indicators that define a path that can be traversed by the vehicle will now be illustrated.

Figure 8:
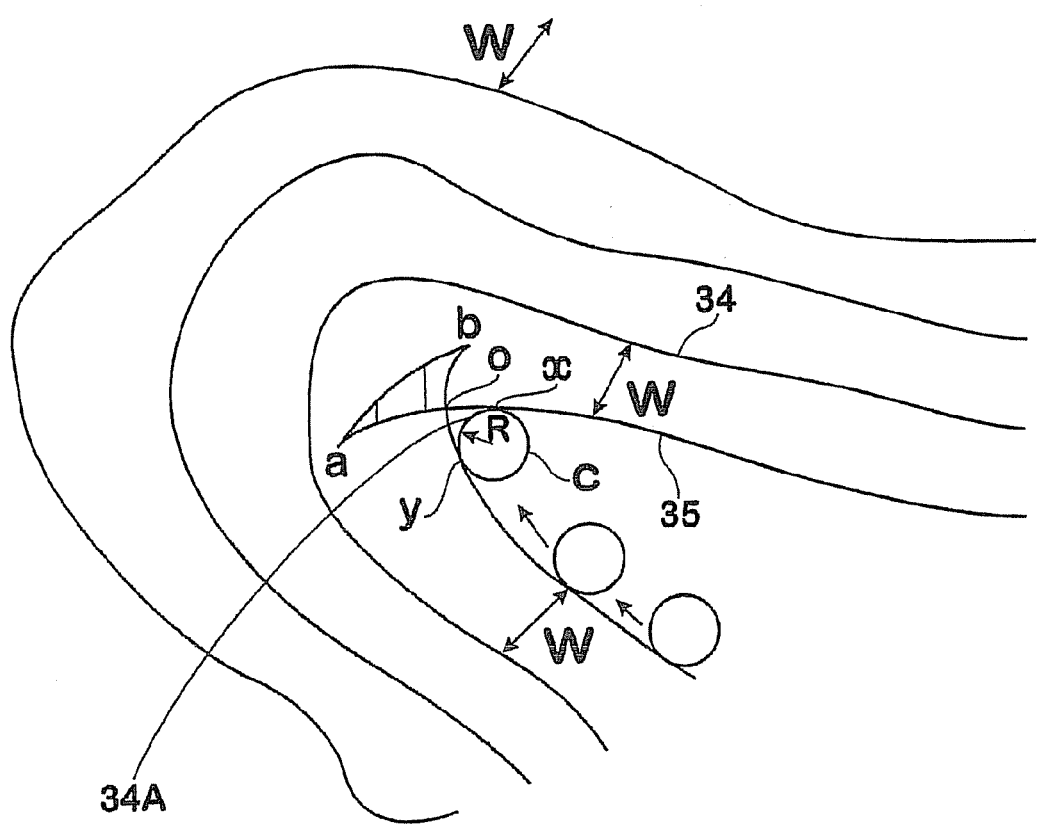
FIG. 8 is a diagram illustrating a method of determining alternative guidance indicators employed by the vehicle guidance software.

FIG. 8 depicts a portion of a path in region 74 of FIG. 7. It will be noted that path 34 can be traversed by the vehicle, however the subsequent path 35 contains a position O that can not be traversed by the vehicle due to its minimum turning radius. If the vehicle were to travel along path 35 it would be necessary to reverse the vehicle, and follow the path as defined by a and b which for reasons given above would not be practical.

To counter this difficulty the vehicle guidance software first detects these regions by trailing a circle C of radius R around the path defined by the generated guidance indicators. In this case, R is the minimum turning radius of the vehicle or a valve above that radius in the case where the vehicle is towing an implement. If the circle touches the path at more than one point, as occurs when the circle C is near to the point 0, a region of critical curvature has been detected and the contact points x and y are logged by the system.

Further, since the circle has a radius equal to the minimum turning radius, the path defined by the arc x-y, 34A will be able to be negotiated by the vehicle.

Accordingly, the adaptive portion of the vehicle guidance software then generates alternative guidance indicators that lie on the arc x-y, 34A. Those alternative guidance indicators are then used by the guidance system to guide the vehicle along the path defined by the alternative guidance indicators, and then along the existing path defined by the current guidance indicators.

Referring once more to FIG. 3, as previously described, at box 115 a check is performed to determine if a user event has occurred. Such an event is typically the operator of the vehicle driving the vehicle off a calculated path. Upon the user driving off the path the software maintains a track of the path for future processing in order that the vehicle may be guided back to the path if desired by the operator of the vehicle. A record of the trail, i.e. the path of the vehicle away from a path, is made as a double-lined path. A double line path is generated by offsetting a path on either side by a fixed amount. The determination of a corresponding double line path preserves the integrity of the original path. The integrity of the original path may be jeopardised when the driver deliberately guides the vehicle off the path. Referring to FIGS. 9 and 10 it may be seen that by using double lined paths, while the vehicle is under manual control, the integrity of the path may be maintained.

This is because upon the vehicle rejoining the path Region A and Region B are produced as options for subsequent processing. Depending on the complexity of the manual path, there may be additional regions produced to Regions A and B. Additional regions may be processed successively later. The region which the farmer wants to process first is set to active. A prompt for input from the farmer as to the region to be processed first is issued. Based on the farmer's response the corresponding region is flagged as "active", all other regions are set to "inactive". Region B is processed after processing of Region A is complete. It would not be possible to process the regions separately with reference to a single line contour without a danger of overlap of processed regions occurring. Hence the use of double lined paths.

While the vehicle is manually driven off a path OP's are calculated as the closest points to the vehicle on the boundary path, excluding the double-sided trail to a distance of radius x, where x is the difference between the current OP and the vehicle position. FIGS. 9*a* and 9*b* show a diagrammatic description of this path following method.

In the event that the operator of the vehicle wishes to rejoin the path, the system is programmed to determine the two OP from the doubleline contour, and prompts the farmer to choose from the left or right contour as shown in FIG. 10 and previously described.

Clearly the actual structure of the vehicle guidance software 8 may be varied.

The software includes a processing portion for generating a set of points interpolating between waypoints. Here the term "portion" simply refers to a subsection of the program code and may for example be a function or a procedure depending on the programming language used. Means for determining a further set of waypoints calculated to define a guidance path offset from a first path wherein tangents of the first path at each of the first set of waypoints are parallel to tangents of the second path at each of the second set of waypoints is also included.

In the above examples discussed, application of an embodiment of the invention to generate contours on the inside of a reference contour or boundary has been described.

The method and software product of the invention may also be readily applied to generate paths on the outside of a closed reference path or boundary.

It will of course be realised that the above has been given only by way of illustrative example of the invention and that all such modifications and variations thereto as would be apparent to persons skilled in the art are deemed to fall within the broad scope and ambit of the invention as defined in the appended claims.

The invention claimed is:

1. Computer readable medium containing computer executable instructions for vehicle guidance comprising:
    an input portion for data corresponding to a set of waypoints defining an initial course for said vehicle;
    a processing portion adapted to produce guidance indicators usable by a guidance system for said vehicle from the set of waypoints; and
    an adaptive portion for generating alternative guidance indicators if one or more of the guidance indicators define a path that can not be traversed by the vehicle due to its minimum turning radius.

2. Computer readable medium according to claim 1 including means for determining said set of waypoints associated with said vehicle.

3. Computer readable medium according to claim 2 wherein the means for determining the set of waypoints is a GPS receiver.

4. Computer readable medium according to claim 2 wherein the means for determining the set of waypoints is via retrieval from a data storage medium.

5. Computer readable medium according to any one of claim 1 including means for determining a successive set of waypoints from a current set of waypoints to define a successive path for said vehicle.

6. Computer readable medium according to claim 5 wherein said successive set of waypoints comprises a corresponding waypoint for each waypoint in the current set, each said corresponding waypoint being calculated to be offset from a current waypoint by the working width of the vehicle and wherein the tangent to the path at each corresponding waypoint is parallel to the tangent at its current waypoint.

7. Computer readable medium according to claim 5, wherein said successive set of waypoints is calculated from the mathematical path defined by said guidance indicators and alternative guidance indicators, each of said successive set of waypoints being calculated to be offset from the mathematical path by the working width of the vehicle and wherein the tangent to the path at each of said successive set of waypoints is parallel to the tangent of the mathematical path at the point perpendicular to each successive waypoint.

8. Computer readable medium according to any one of claim 1 the guidance indicators are produced from the set of waypoints via a computer assisted interpolation between the waypoints.

9. Computer readable medium according to claim 8 wherein the interpolation is according to a bi-variate periodic bi-cubic B-spline fitting algorithm.

10. Computer readable medium according to any one of claim 1 wherein the alternative guidance indicators are on an arc of a circle having a radial length equal to the minimum turning radius, said circle contacting the path defined by the current guidance indicators at more than one point.

11. A computer implemented method for guiding a vehicle having a guidance system associated therewith and a minimum turning radius said method including the steps of:
    generating guidance indicators from a plurality of waypoints;
    determining whether one or more of the generated guidance indicators define a path that can not be traversed by the vehicle due to its minimum turning radius and if necessary, determining one or more alternative guidance indicators; and utilizing the guidance indicators, and alternative guidance indicators in the guidance system to guide the vehicle.

12. A guidance system for a land vehicle having a minimum turning radius, said system comprising:

a processor;

a computer program, executable by said processor for generating a plurality of guidance indicators from a set of waypoints and for determining alternative guidance indicators if the generated guidance indicators define a path that can not be traversed due to the minimum turning radius; and means for utilizing the generated guidance indicators and the alternative guidance indicators to guide the land vehicle.

* * * * *